United States Patent [19]
Sansone et al.

[11] Patent Number: 5,918,220
[45] Date of Patent: Jun. 29, 1999

[54] METHOD AND SYSTEM FOR WORLDWIDE MEDIA SELECTION, PRODUCTION, AND DELIVERY

[75] Inventors: Ronald P. Sansone, Weston; Paul A. Levitsky, Bridgeport, both of Conn.

[73] Assignee: Pitney Bowes Inc., Stamford, Conn.

[21] Appl. No.: 08/772,788

[22] Filed: Dec. 24, 1996

[51] Int. Cl.⁶ ........................................ G07B 17/00
[52] U.S. Cl. .................. 705/408; 235/375; 364/479.03; 364/479.05; 705/8; 705/401
[58] Field of Search ................ 235/375; 364/400, 364/478.01, 478.07, 478.08, 478.11, 479.01, 479.02, 479.03, 479.05; 395/101, 114, 200.03; 705/7, 8, 400, 401, 408, 410; 707/104, 500, 517, 518, 521

[56] References Cited

U.S. PATENT DOCUMENTS

| | | | |
|---|---|---|---|
| 4,731,048 | 3/1988 | Marella et al. | 493/188 |
| 4,800,505 | 1/1989 | Axelrod et al. | 364/478 |
| 4,831,555 | 5/1989 | Sansone et al. | 395/113 |
| 4,837,701 | 6/1989 | Sansone et al. | 705/404 |
| 4,908,770 | 3/1990 | Breault et al. | 705/404 |
| 4,941,091 | 7/1990 | Breault et al. | 705/30 |
| 5,051,914 | 9/1991 | Sansone et al. | 364/478.11 |
| 5,067,305 | 11/1991 | Baker et al. | 53/411 |
| 5,068,797 | 11/1991 | Sansone et al. | 364/478.07 |
| 5,072,253 | 12/1991 | Patton | 358/40 |
| 5,072,401 | 12/1991 | Sansone et al. | 364/478.07 |
| 5,119,306 | 6/1992 | Metelits et al. | 705/406 |
| 5,142,482 | 8/1992 | Sansone | 364/478.09 |
| 5,161,109 | 11/1992 | Keating et al. | 705/410 |
| 5,251,251 | 10/1993 | Barber et al. | 379/67 |
| 5,270,398 | 12/1993 | Sansone et al. | 705/406 |
| 5,283,752 | 2/1994 | Gombault et al. | 364/478.09 |
| 5,426,594 | 6/1995 | Wright et al. | 364/514 R |
| 5,473,143 | 12/1995 | Vak et al. | 235/380 |
| 5,476,255 | 12/1995 | Murcko et al. | 271/109 |
| 5,513,117 | 4/1996 | Small | 364/479 |
| 5,546,316 | 8/1996 | Buckley et al. | 364/479.03 |
| 5,552,994 | 9/1996 | Cannon et al. | 364/468.01 |
| 5,561,604 | 10/1996 | Buckley et al. | 364/479.05 |
| 5,586,036 | 12/1996 | Pintsov | 705/408 |
| 5,602,742 | 2/1997 | Solondz et al. | 705/410 |
| 5,628,249 | 5/1997 | Cordery et al. | 101/91 |
| 5,684,706 | 11/1997 | Harmon et al. | 364/468.01 |
| 5,737,729 | 4/1998 | Denman | 705/401 |
| 5,777,883 | 7/1998 | Lau et al. | 364/478.08 |

*Primary Examiner*—Edward R. Cosimano
*Attorney, Agent, or Firm*—Melvin Scolnick; Charles Malandra, Jr.; David Pitchenik

[57] ABSTRACT

The invention is a method for selecting, producing, and delivering a finished mail piece. The method includes the step of selecting, at an initiating node, a set of parameters which together comprise a mail piece to be produced at a remote location. The selection is made from a series of menus within a program resident within a data processing system. Among the parameters which can be selected or determined are the destination address, type of delivery service to be used, and a choice of the media stock upon which a selected text can be printed. Additionally, a choice of language for the text can be made, and an account number for debiting the cost of the transaction may be entered. The selected parameters are transmitted to a data center which reads the destination address and then determines the most appropriate destination node. It is possible for the data center to be co-located with the initiating node or, to be the destination node. The data center, which maintains all data with respect to a particular transaction, will transmit the selected parameters to the destination node. Upon receipt of the data, the destination node prints the selected text upon a media which is inserted into an envelope with the destination address printed upon the envelope. The envelope is then franked in proper local currency and delivered to a local postal stream for final delivery to the destination address.

16 Claims, 11 Drawing Sheets

METHOD AND SYSTEM FOR WORLDWIDE MEDIA SELECTION, PRODUCTION, AND DELIVERY

RELATED APPLICATIONS

Reference is made to Application Ser. No. 08/772,798, entitled CHANNEL SWITCHED MAIL MESSAGE SWITCHING AND METERING SYSTEM, assigned to the assignee of this application and filed on even date herewith.

Reference is made to application Ser. No. 08/772,790, and now U.S. Pat. No. 5,742,932 issued Apr. 21, 1998 to Levitsky, entitled METHOD AND SYSTEM OF ACCOUNTING FOR TRANSACTION COSTS AND CURRENCY EXCHANGE IN A HYBRID MAIL SYSTEM, assigned to the assignee of this application and filed on even date herewith.

Additionally, reference is made to application Ser. No. 08/772,787, entitled A METHOD AND SYSTEM FOR MAIL PIECE PRODUCTION UTILIZING A DATA CENTER AND INTER-RELATED COMMUNICATION NETWORKS, assigned to the assignee of this application and filed on even date herewith.

BACKGROUND OF THE INVENTION

In recent years, the term "hybrid mail" has grown with increased acceptance as the business and technical communities have found better and more efficient ways to utilize the mail stream not only in the United States, but across the global marketplace as well. Hybrid mail is a creature of the evolution of technology and the mail stream. Where once a mail piece was created locally and then dropped into the closest available mailbox for eventual delivery to a remote location, now the entry points into the mail stream are virtually unlimited. Thus, the creation of the hybrid mail piece.

With the introduction of computer based stand-alone kiosk devices, some greeting card manufacturers are now offering users the means to personalize messages for a selected greeting card. These systems produce a personalized greeting card that is turned over to the sender to finish before being placed into the mail stream. However, the blending of hybrid mail and the production of finished mail pieces such as addressed and coded greeting cards, business reply cards, or other forms of correspondence has not occurred.

One of the key elements to the importance hybrid mail is the ability of the user to get the finished mail piece to its intended destination not just more quickly, but also at a cheaper cost. Additionally, if the mail piece is to cross borders so that two separate currencies are involved in the transaction, there must be a way to efficiently charge a customer in local currency while franking the mail piece in the currency of the remote location; otherwise, the delicate balance of cost, time, and convenience will be upset.

A disadvantage of the prior art is that there has not been an effective marriage of the various art forms required to produce an automated process for causing data processing systems to produce a mail piece from an extensive catalogue of options, transmitting the newly created mail piece to a remote location and then finishing the mail piece remotely while preparing local billing in respect of the service conveyed.

Thus, an objective of the present invention is to provide a cost effective means of delivering a finished mail piece to its ultimate destination with the look and feel of a locally assembled product. The advantage is that the person receiving the mail piece at its final destination will receive a piece that is timely, printed locally in the local language, and franked locally despite having origins that might be quite remote.

SUMMARY OF THE INVENTION

According to the invention, the object is achieved and the disadvantages of the prior art are overcome by a method for selecting, producing, and delivering a finished mail piece.

The method includes selection, at an initiating location or node, of a set of parameters which when taken together define a mail piece. The initiating location or node could be a kiosk at a mall or other public forum, a personal computer at home or in the office, or from a storefront retail application. If using a kiosk, the initiating party can use a credit card to initialize the appropriate program. The selection is made by an initiating party initializing a program in a data processing system and then making choices from a series of menus. The choices together create a mail piece which will be produced at a remote location. The initiator determines a destination address for the completed mail piece and then confirms to the data processing system the selected set of parameters and the destination address.

Among the parameters which can be selected or determined by the initiating party are the destination address and a choice of the media stock (i.e., greeting card format, brochure, newsletter, etc.) upon which the selected text can be printed. Additionally, a choice of language (i.e., French, German, Japanese, Chinese, etc.) for the text can be made from a menu. The actual delivery of the finished mail piece can be effected by choosing the type of delivery service to be used. By including a return address within the selected parameters, the system can store the return address for expediting a reply to the printed media. The initiating party can also enter an account number for debiting the cost of the transaction.

Once confirmed, the selected parameters, together with the destination address, are transmitted to a data center. The data center data processing system will read the destination address, parse the address data, and then determine the most appropriate destination node by comparing elements of the destination address to a list of possible destination nodes that are organized by country, postal code and/or zone. The data center will then transmit the selected parameters and the destination address to the destination node. It is possible for the data center to be co-located with the initiating node; or, for the data center to be co-located with the destination node.

In transmitting the required data, the data center will poll the system at the destination node to determine whether or not the destination node has the necessary resources for fulfilling the selected parameters (i.e.; proper card stock, full range of available texts and/or languages, etc.). If the destination node can fulfill the selected parameters, then the data center will complete downloading of the selected parameters to the destination node. If, however, the destination node can not fulfill the selected parameters, then the data center will transmit the data to the nearest location capable of fulfilling the selected parameters.

Upon receipt of the data, the destination node will print a predefined subset of the downloaded parameters upon a medium. The predefined subset of parameters consists of the data to be printed, as distinct from data required to direct the mail piece to the destination node. It may be necessary for the destination node to establish a queue within the data processing system if more than one set of data is received before a printing job is complete. Once printed, the printed media can be inserted into an envelope with the destination address printed upon the envelope to complete formation of the finished mail piece. The envelope would then be franked in proper local currency.

The franked mail piece is then delivered to a local postal stream for delivery to the destination address. The party initiating the transaction at the initiating node would receive confirmation of the transaction after the mail piece is franked and prior to actual delivery of the mail piece.

The data center acts as the central repository for all data relating to a transaction. The exchange of funds or the charging of an account to pay for services is controlled by recording the franking of the media piece envelope with its proper local currency. If the transaction was initiated in a country different from that of the destination node, then the system will calculate the exchange of local currency at the destination node for the local currency of the initiating node so that the initiating party can be billed in its own local currency. Billing statements for initiators or credit statements for destination nodes originate from the data center.

DETAILED DESCRIPTION OF THE PREFERRED EMBODIMENTS

Figure 1:
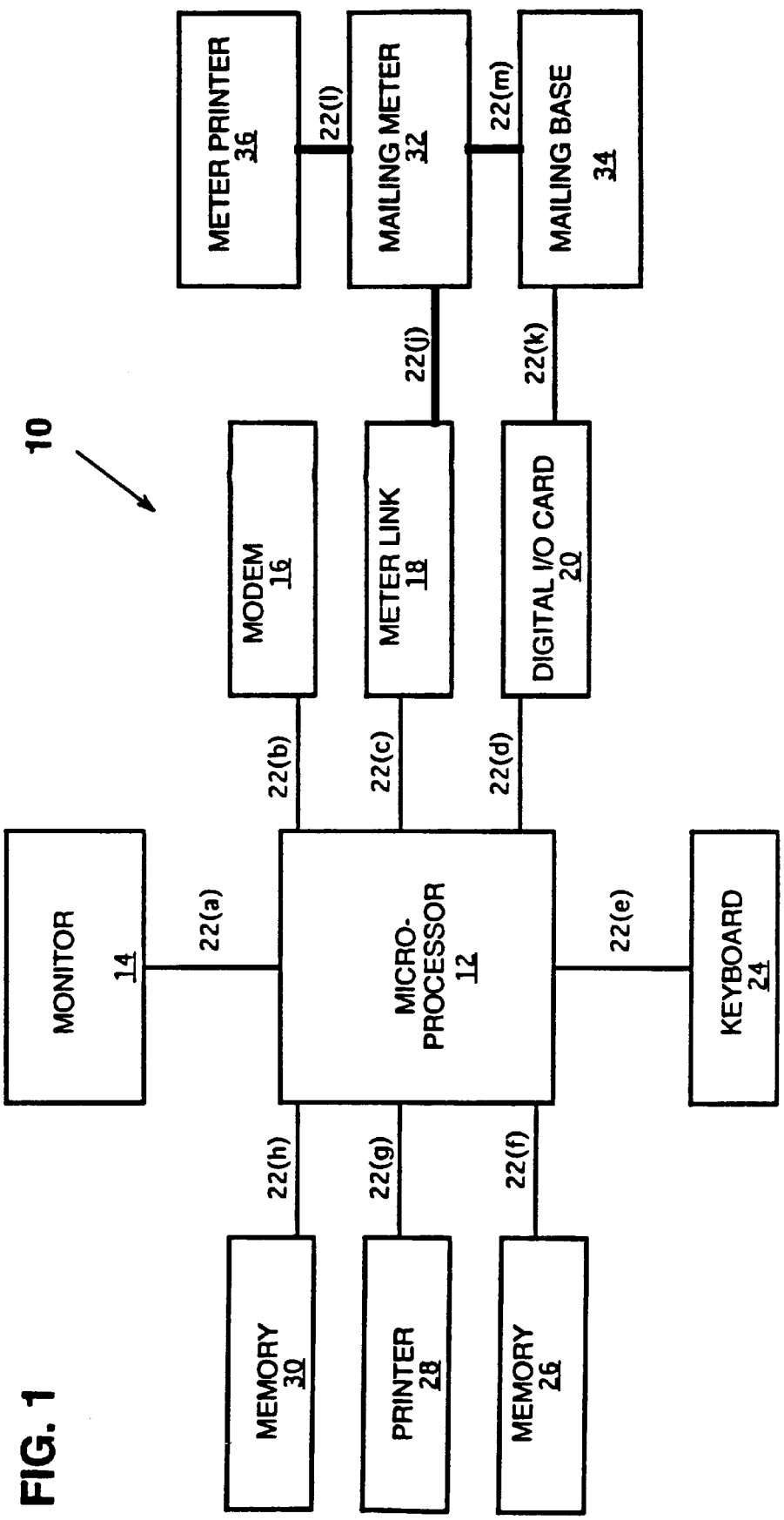
FIG. 1 is a block diagram of a preferred embodiment of a system in accordance with the present invention.

Turning to FIG. 1, an overview of a node within a distribution system representative of a preferred embodiment of the invention is shown in block diagram form.

In FIG. 1, there is shown distribution system 10 is shown which includes: microprocessor 12 connected to monitor 14 by cable 22(a); modem 16 connected to microprocessor 12 by cable 22(b); meter linking device 18 connected to microprocessor 12 by cable 22(c); digital input/output card 20 connected to microprocessor 12 by interface slot 22(d); keyboard 24 connected to microprocessor 12 by cable 22(e); memory 26 connected to microprocessor 12 by cable 22(f); printer 28 connected to microprocessor 12 by cable 22(g); memory 30 connected to microprocessor 12 by cable 22(h); postage meter 32 connected to meter linking device 18 by echoplex interface cable 22(j); mailing base 34 connected to digital input/output card 20 by cable 22(k) and to postage meter 32 by interface cable 22(m); and, meter printer 36 connected to postage meter 32 by interface cable 22(l).

Mailing base 34 is of a kind that can be remotely tripped by a mail piece passage; such bases are known and are developed and marketed by Pitney Bowes Inc. of Stamford, Conn., who is the assignee of the present invention.

Meter linking device 18 allows a host data processing system to remotely control postage meter 32, or known devices such as parcel registers, scales, or mailing machines. It should be noted that one or more postage meters 30 could be operatively connected to microprocessor 12; a corresponding meter linking device 18 would be utilized for each postage meter 32 that is so operatively connected. An example of a meter linking device is the METERLINK mailing product which is developed and marketed by Pitney Bowes Inc. of Stamford, Conn., who is the assignee of the present disclosed invention. Typical applications which would employ a meter linking device are: postage or cost accounting; maintenance of transaction records; setting postage or other meter controls; adding funds to a meter; or, the dispensing of package tapes.

Distribution system 10 has the capability of performing a weekly backup and restore of its data files so that in the event of a system failure, data can be restored. An individual day's data, which might otherwise be lost, can be restored from any of several mediums available which include: tape, diskette, upload from a backup system, upload from a senior level system; or upload from any of a plurality of memory devices to which distribution system 10 can download to.

Figure 2:
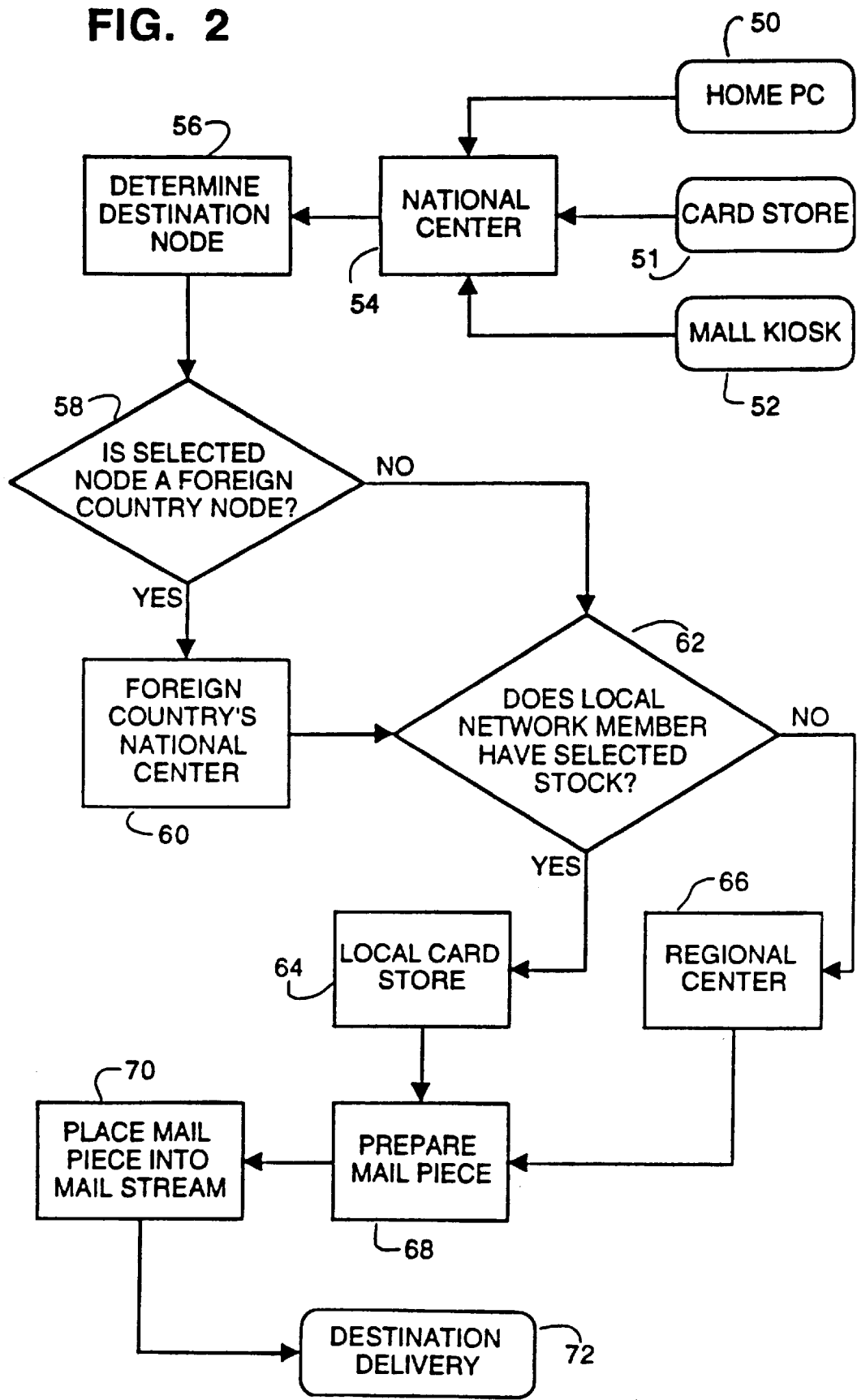
FIG. 2 is a top level flowchart of the system method.

FIG. 2 is a top level flowchart of the system method. Entry into the system can be effected from any of several initiating locations such as home personal computer (PC) 50, card store 51, or mall kiosk 52 (hereinafter "initiating points"). If entry is effected from home PC 50, then it is anticipated that home PC 50 would only be acting as an entry point into the system and not as a destination node because of the limited media capability. It should be noted, however, that an upgrade capability for home PC 50 is both possible and desirable for those cases where capability expansion is required such as when a home PC is used within a home-based business venture. Card store 51 is representative of the distribution system identified in FIG. 1 and anticipates both an initiating point and a destination node. Mall kiosk 52, which is similar to the well known bank ATMs, allows walk-through traffic in public areas to access the system as an initiating point.

The initiating points determine the parameters of the mail piece to be created at the destination node. The destination node is the location at which the mail piece will be created. The method advances from initiating points 50, 51, and/or 52 to step 54 where the mail piece parameters (hereinafter "data") are downloaded to a national or regional data center. The data center acts as a hub for the receiving of mail piece data and determines at step 56 what the destination node will be. From step 56 the method advances to a query at step 58.

At step 58 the method queries as to whether or not the selected destination node is outside the boundaries of the national or regional data center. If the response to the query is "Yes," then the method advances to step 60 by distributing the mail piece data to national or regional data center that serves the destination node. From step 60, the method advances to the query at step 62. If, however, the response to the query of step 58 is "No," then the method advances directly to the query at step 62.

At step 62, the method queries the system as to whether or not the local network member, or destination node, has the card stock or media necessary to respond to the mail piece data being downloaded. This query anticipates that destination nodes update the system with their inventory status on a regular basis. The basis for update can be regular time intervals or updating essentially simultaneously with the production of mail pieces on an on-going basis. If the response to the query is "Yes," then the mail piece parameters are downloaded at step 64 to the destination node which is typically going to be a local card store or similar retail facility. If, however, the response to the query at step 62 is "No," then the mail piece data will be downloaded at step 66 to the closest data center having the required card stock or media; that data center now becomes the terminal node. It is anticipated that the closest available data center be a regional or national center whose media inventory should be as complete as possible on a continuous basis. It is possible, however, that the mail piece parameters simply be diverted to the closest available local card store or retail facility.

From steps 64 and 66, the method advances to step 68 where the mail piece data is downloaded to a data processor at the destination node; the card parameters are printed to a media; the card is then inserted into an envelope and the envelope sealed; the address and required bar coding are printed directly to the envelope; the envelope is franked with the proper local postage; and, then the method advances to step 70 where the mail piece is placed into the mail stream for delivery at step 72 to the destination address.

Figure 3A:
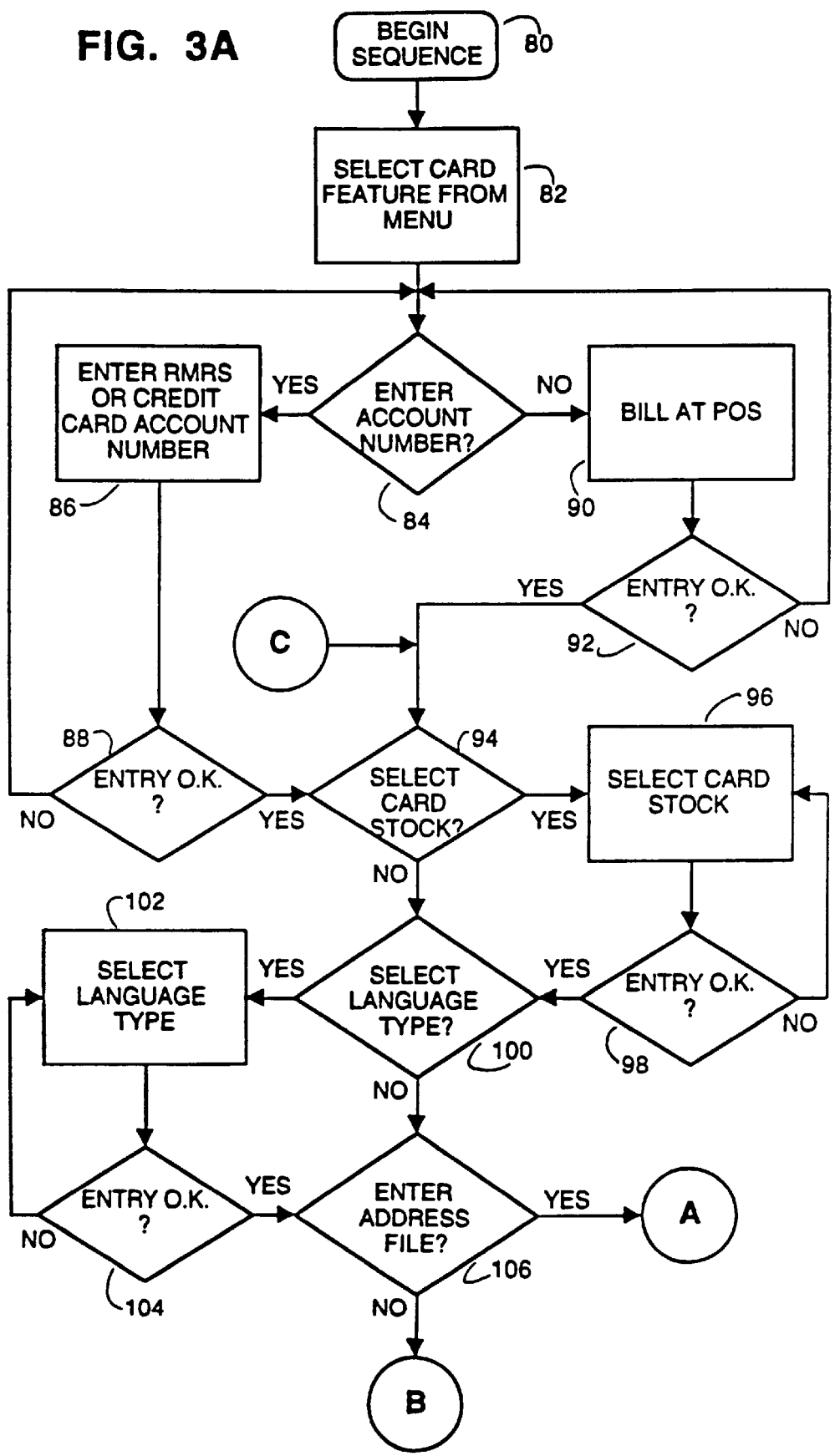
FIGS. 3A through 3D are a flowchart of the system method that begins with the flow of data as determined by customer selection and utilization thereof.

A detailed flow of the method begins at FIG. 3A. The method sequence is initiated at step 80 and advances to step 82 where the customer or initiator selects the "card" feature from a menu of possible programs or features. The method advances from step 82 to a query at step 84. At step 84, the system queries as to whether or not an account number is to be used for access to the system. If the response to the query is "Yes," then the method advances to step 86 where a Remote Meter Resetting Service (hereinafter "RMRS") account can to be accessed by the initiator; or, in the alternative, if the initiator is using a mall kiosk as the initiating location, then at step 86 the initiator can enter a credit card for access. Upon entry of an account number, the method advances to step 88 and queries as to whether or not the entry just made is correct. If the response to the query is "Yes," then the method advances to step 94. If the response to the query at step 88 is "No," then the method returns to re-enter the flow at step 84. If the response to the query at step 84 is "No," then the method advances to step 90 where a point-of-sale (POS) billing is established so that the customer can pay by cash or check. Upon establishment of POS billing, the method advances to step 92 and queries as to whether or not the entry just made is correct. If the response to the query is "Yes," then the method advances to step 94. If the response to the query at step 92 is "No," then the method returns to re-enter the flow at step 84.

At step 94, the customer or system initiator (hereinafter "system user") is queried as to whether a card stock is to be selected. If the response to the query is "Yes," then the method advances to step 96 where the customer or system initiator selects the card stock (i.e., the media to be printed upon) and an appropriate message from a catalogue. The catalogue can exist in several ways. First, the catalogue can be completely on-line where the system user can scroll through a listing of available stock and message types; the catalogue can exist as a CD-ROM (or other suitable memory type) obtained as part of a subscription/customer service from the system provider from which the system user can make a selection; or third, the catalogue can exist as printed media from which a catalogue number for a particular media type or message can be obtained and entered into the system at step 96. From step 96, the method advances to step 98 which queries as to whether or not the selection made at step 98 is correct. If the response to the query is "Yes," then the method advances to a query at step 100. If, however, the response to the query at step 98 is "No," then the method returns to step 96 where the card stock and message can be reselected.

It should be noted that a custom entry key (F8 or other available program key) is made available to the system user at steps 94, 100, 106, and 112. The purpose of the custom entry key is to allow the user to enter user defined data. In the case of step 94, the user can personalize a message rather than use a message from the catalogue. The advantage to a catalogue selection is the ability to send a language or dialect specific message, but at step 100 when the language selection is made, it is possible to select "OTHER" and then through the use of the custom key to select language dictionary assistance or to simply overwrite an existing message.

Returning to step 94, if the response to the query is "No," then the method advances directly to the query at step 100. At step 100, the method queries as to whether or not a language type is to be selected. If the response to the query is "Yes," then the method advances to step 102 where an appropriate language selection is made from a list or catalogue. The language selection is applied to the non-custom message selected at step 94 and the method advances to step 104 which queries as to whether or not the selection made at step 102 is correct. If the response to the query is "Yes," then the method advances to a query at step 106. If, however, the response to the query at step 104 is "No," then the method returns to step 102 where the language type can be reselected.

Figure 3B:
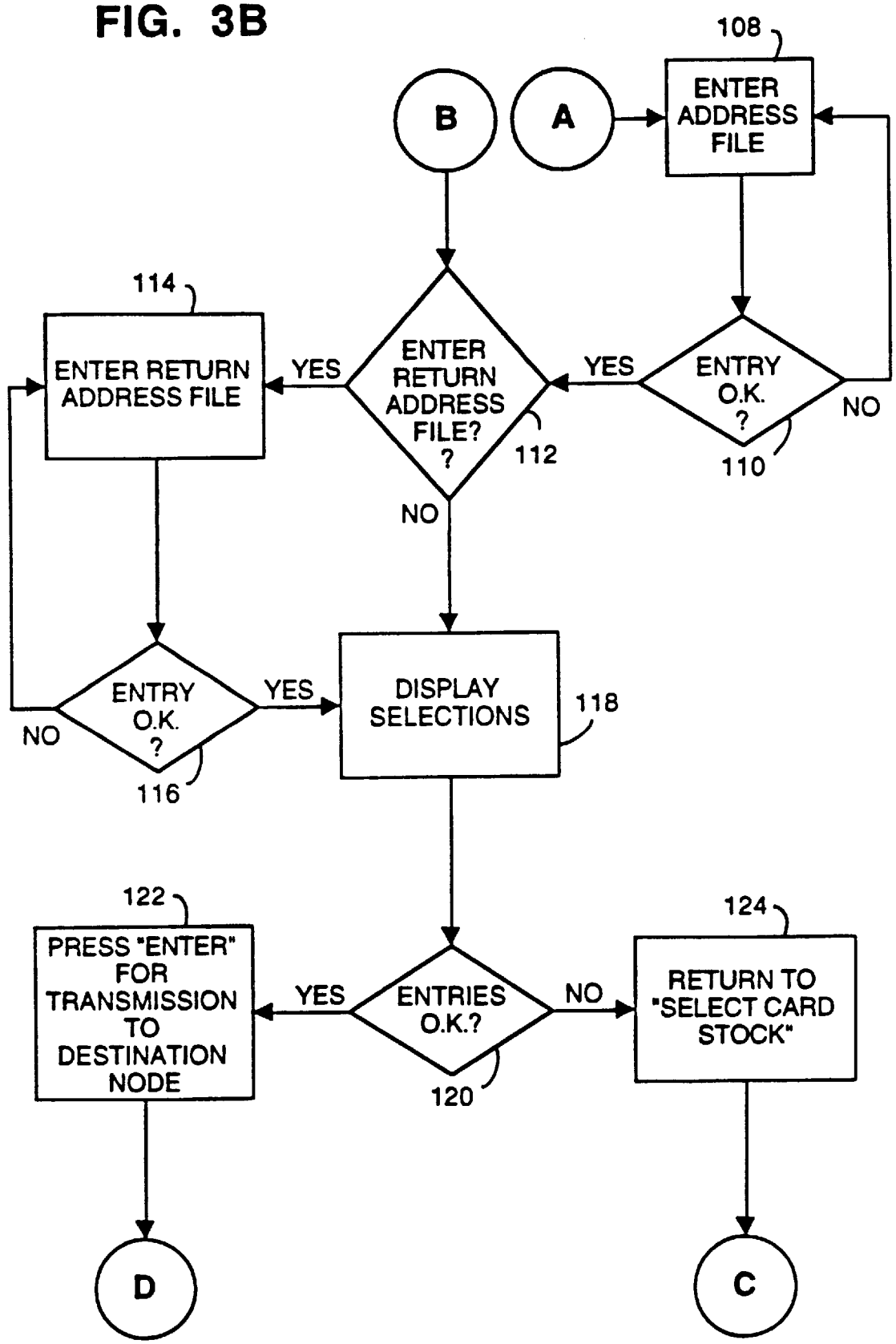

Returning to step 100, if the response to the query is "No," then the method advances directly to the query at step 106. At step 106, the method queries as to whether or not an address file is to be entered. If the response to the query is "Yes," then the method advances along path A to step 108 as shown in FIG. 3B. If however, the response to the query at step 106 is "No," then method advances along path B directly to step 112.

Both paths A and B re-enter the method flow in FIG. 3B. Path B re-enters at step 112. Path A re-enters at step 108 where the address file is selected from among a list of address parameters available, or the custom key can be employed to make a completely manual entry. The method advances from step 108 to step 110 which queries as to whether or not the selection made at step 108 is correct. If the response to the query is "Yes," then the method advances to a query at step 112. If, however, the response to the query at step 110 is "No," then the method returns to step 108 where the address file can be re-entered.

At step 112, the method queries as to whether or not a return address file is to be entered. If the response to the query at step 112 is "No," then the method advances directly to step 118. If, however, the response to the query is "Yes," then the method advances to step 114 where the return address file is selected from among a list of address parameters available, or the custom key can be employed to make a completely manual entry. The method advances from step 114 to step 116 which queries as to whether or not the selection made at step 114 is correct. If the response to the query is "Yes," then the method advances to step 118. If, however, the response to the query at step 116 is "No," then the method returns to step 114 where the return address file can be re-entered.

Step 118 displays the selections made. The display can be a listing of the parameters selected or can be in the form of a graphic layout. The method will then advance to step 120 and query as to whether or not all entries are correct. If the response to the query is "No," then the method advances to step 124 which initiates a return, via path C, to "Select Card Stock" at step 94 in FIG. 3A. If the response to the query at step 120 is "Yes," then the method advances to step 122 where the system user presses the "ENTER" key for transmission of the mail piece parameters to the destination node. From step 122, the method advances, via path D, to step 126 in FIG. 3C.

Figure 3C:
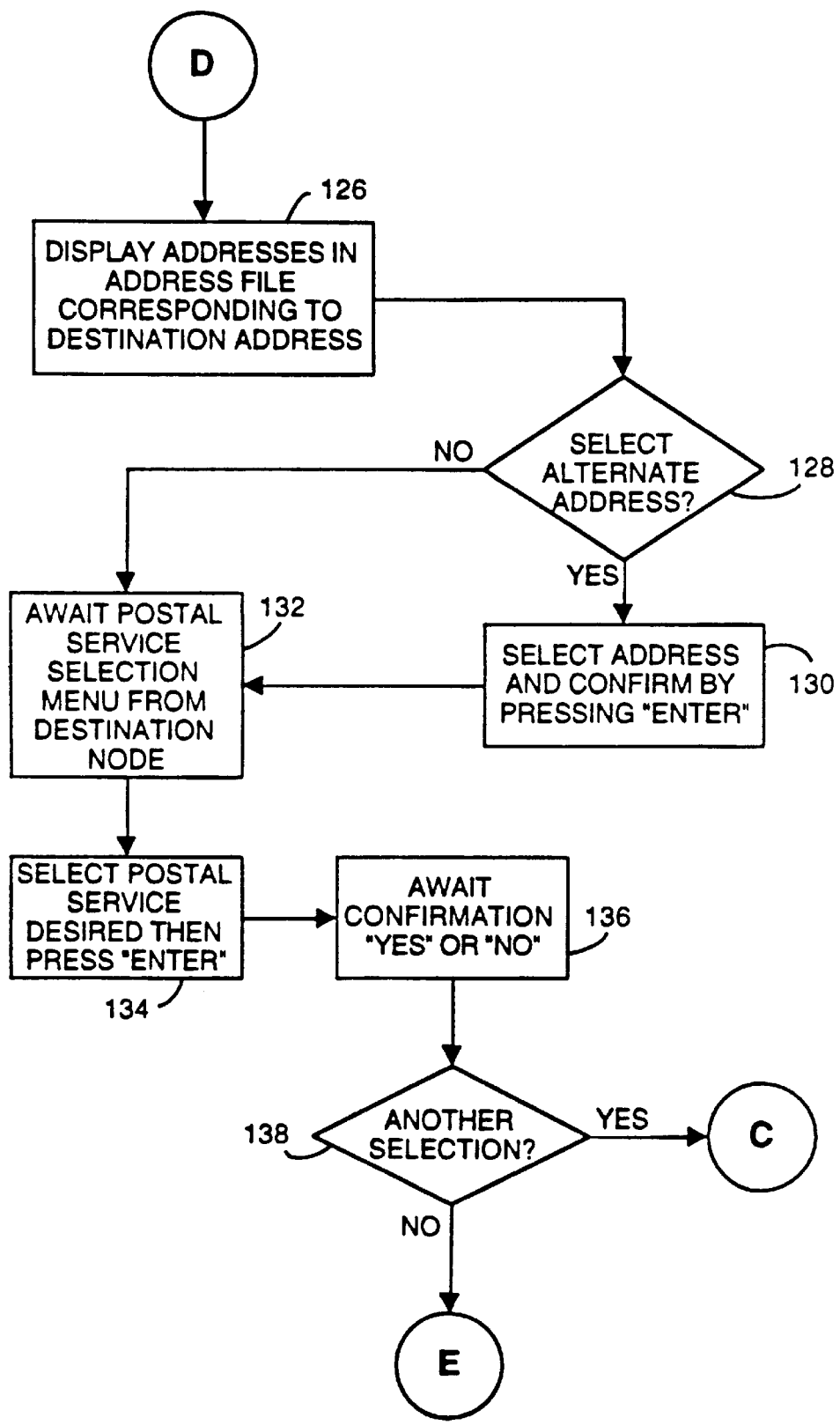

Turning to FIG. 3C, path D is shown to enter at step 126 where the method causes the system to display a list of alternative addresses that may be on file for the mail piece addressee. These alternative addresses can be stored in a database at the destination node or at any of the data centers in the flow between initiation and destination. The method advances from step 126 to step 128 where the system user is queried as to whether or not an alternative address is to be selected from the list. If the response to the query is "Yes," then the method advances to step 130 where the alternative address is selected and confirmed by pressing "ENTER." From step 130, the method advances to step 132. If the response to the query at step 128 is "No," then the method advances to step 132 where the initiation location awaits a postal service selection menu from the destination node. This step anticipates that the data centers and/or the destination node will maintain a listing of mail and/or delivery services (i.e., overnight delivery; third class; courier; etc.) and rates available for a given destination address; and, upon a query from the initiating location, the services listing and rates are transmitted to the initiating location so that the system user can select the appropriate service at step 134. After making the desired selection, the method advances to step 136 to await a confirmation that the mail piece has been placed in the queue for franking. When the initiating location receives confirmation, the method advances to a query at step 138.

The system queries at step 138 as to whether or not the system user wants to make another selection. If the response is "Yes," then the method advances along path C to re-enter the system at step 94 in FIG. 3A. If, however, the response to the query at step 138 is "No," then the method advances along path E to re-enter the system at step 140 in FIG. 3D.

Figure 3D:
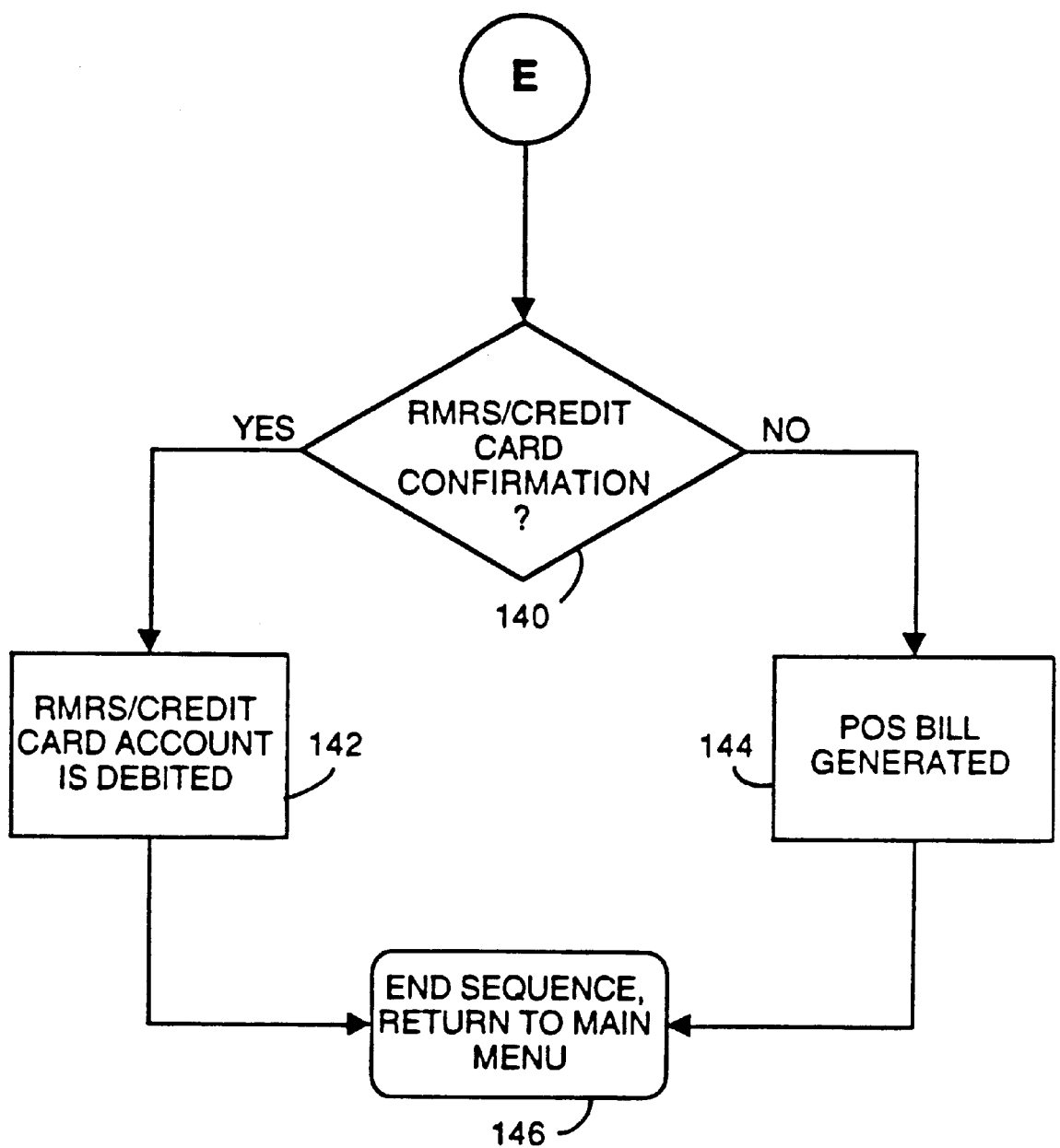

Turning to FIG. 3D, path E enters at step 140 where the system queries as to whether or not an RMRS or credit card confirmation is required. If the response to the query is "No," then the system will generate a POS billing for the customer before the method advances to step 146. If the response to the query at step 140 is "Yes," then the RMRS or credit card account is debited, in step 142, before the method advances to step 146. At step 146, the system user sequence is completed and the system returns to the main menu of the program.

In addition to the sequence of steps that directly involve the system user, there are steps that must be performed by the destination node and at each of the data centers that might be utilized between initiation and destination. The flow for these additional steps begins at FIG. 4A.

Figure 4A:
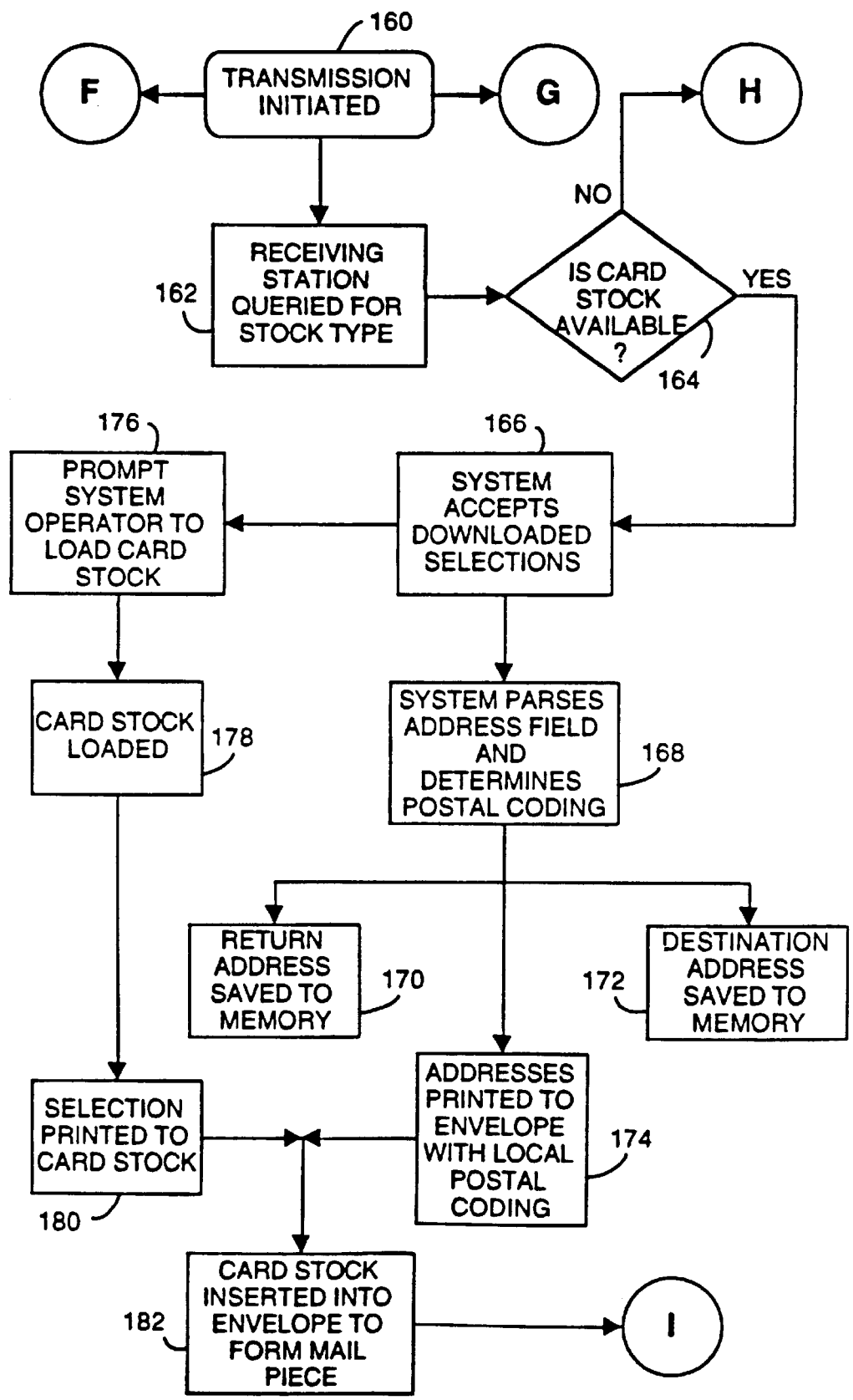
FIG. 4A through 4C are a flowchart of the system at a receiving location that assumes that the initiation of a transmission has already occurred, details the exchange of certain parameters between the initiating location and the receiving location, and details the preparation for shipment of a mail piece whose parameters are selected at an initiating location.
Figure 4B:
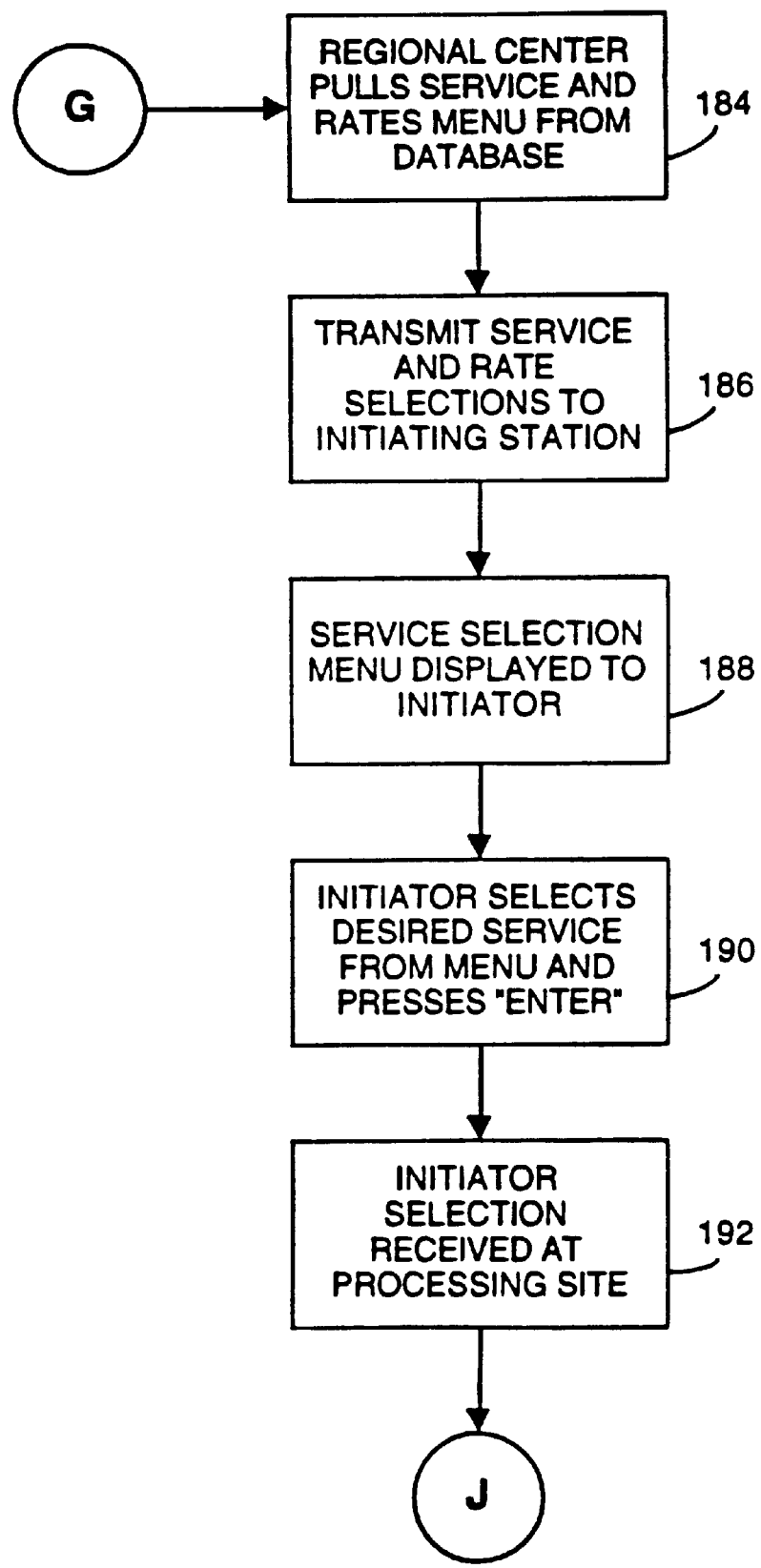

FIG. 4A begins with the initiation of the mail piece parameter transmission by the initiating location at step 160. There are three paths that radiate from step 160. From step 160, the method advances to step 162 where the intended receiving location, or destination node, is presented with the mail piece data and then queried at step 164 as to whether or not the required card stock, as defined by the mail piece data, is available at this location. Returning to step 160, it can be seen that two additional paths are accessed. Step 160 advances along path F to step 250 in FIG. 5B.; and, additionally along path G to step 184 in FIG. 4B. Each of FIGS. 5B and 4B are described in detail hereinbelow.

At step 164, the method queries as to whether or not the required card stock, or other printable media, is available for printing at the intended destination node. If the response to the query is "No," then the method advances along path H to step 220 in FIG. 5A. If, however, the response to the query at step 164 is "Yes," then the method advances to step 166 where the destination node accepts the downloaded mail piece data.

From step 166 the system follows two paths. In following the first path, the method advances to step 176 where the system operator is prompted to load the correct card stock or other printable media. In an alternative embodiment of the system configuration, the paper stock is maintained in a "jukebox" of a type associated with the library use of CD-ROMs and which is well known to those skilled in the art. The downloading of the mail piece data causes the jukebox to select the proper feed path for the requested printable stock. The system operator, or jukebox, loads the correct card stock or printable media at step 178 and the mail piece selection is printed to the loaded printable stock at step 180. The method advances from step 180 to step 182 where the printed card or media is inserted into an envelope which has the destination address, return address, and any bar coding data printed thereupon. From step 182, the method moves along path I to step 194 in FIG. 4C.

The second path leading from step 166 advances to step 168 where the system parses the address field of the mail piece data and determines appropriate postal coding. The method next calls for the addresses to be printed to the envelope at step 174 while essentially simultaneously saving, at step 172, the address data to a memory of a type capable of maintaining a database; and, saving to a memory at step 170 the return address data. Step 174 advances to step 182 where the printed card or media is inserted into the envelope which has the destination address, return address, and any bar coding data printed thereupon. From step 182, the method moves along path I to step 194 in FIG. 4C.

Turning to FIG. 4B, path G is shown re-entering the system at step 184 where the data center pulls service and rates listings, from a database, for a particular destination node. The system transmits the service and rates listings to the initiating station at step 186 where the listings are displayed on a monitor to the system user at step 188. The method then advances to step 190 where the system user selects the desired service from the displayed listing of services and rates available presses "ENTER" to confirm the selection. The confirmed selection is transmitted to the destination node at step 192. From step 192, the method advances along path J to step 194 in FIG. 4C.

Figure 4C:
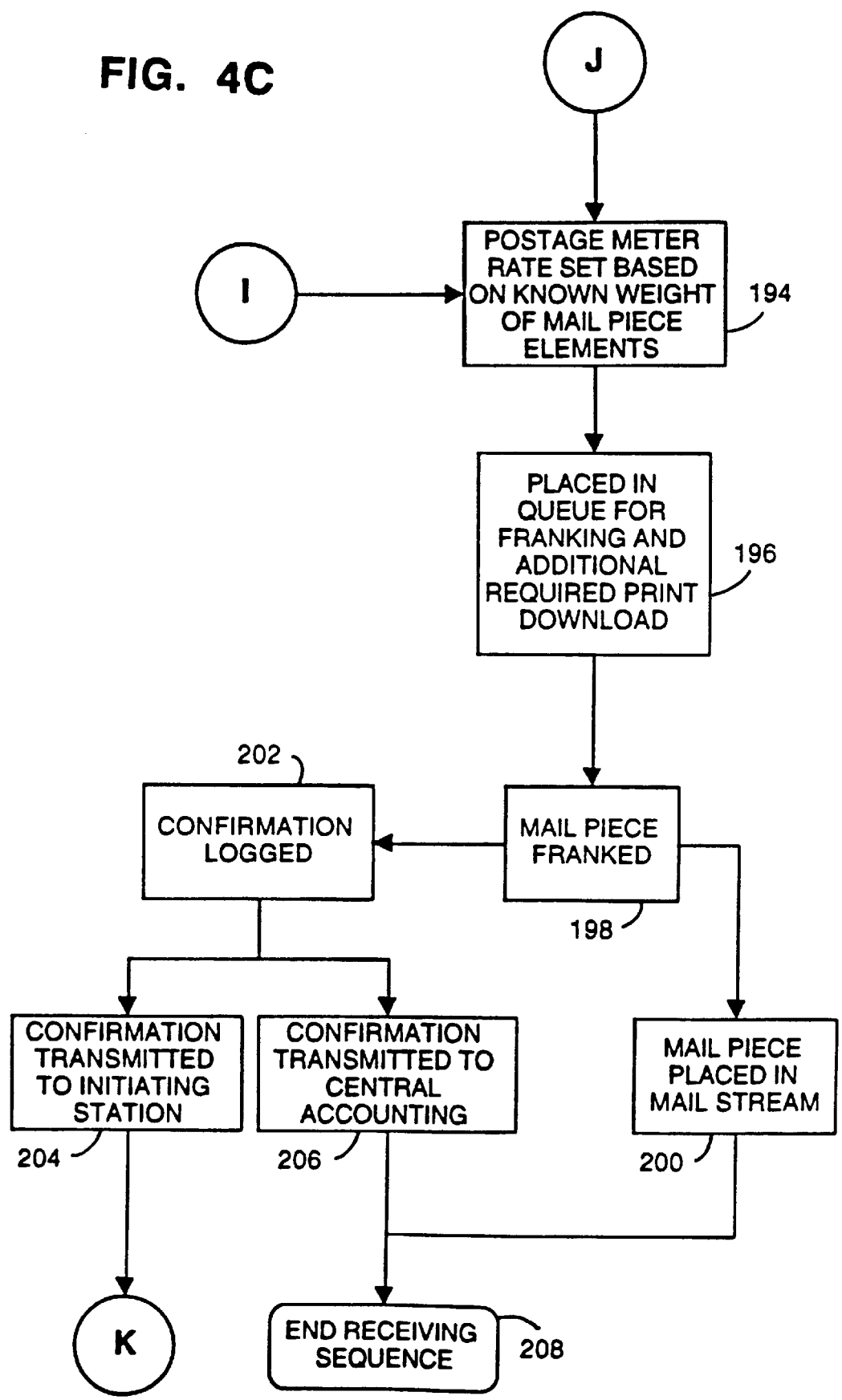

FIG. 4C follows the flow of the method steps as they are performed at the destination node. Paths I and J are shown re-entering the system at step 194. At step 194, the postage meter rate for the finished mail piece is determined based upon the known weight of the mail piece elements. The method advances to step 196 where the mail piece is placed in a queue, if required, for franking and for further print download, if required. The mail piece is franked at step 198 and then the method advances, essentially simultaneously, along two paths from step 198.

Path one proceeds to step 202 where confirmation of the mail piece franking is logged to the database. After the confirmation is logged, the confirmation is transmitted to the initiating station at step 204 and to a central accounting data center at step 206. The central accounting data center will prepare the necessary billing and/or debit/credit the appropriate accounts. From step 204, the method advances along path K to step 254 in FIG. 5B. Whereas, from step 206, the method advances to step 208 where the receiving sequence is terminated.

Path two proceeds from step 198 to step 200 where the franked mail piece is placed into the local mail or delivery stream. From step 200, the method advances to step 208 where the receiving sequence is terminated.

Figure 5A:
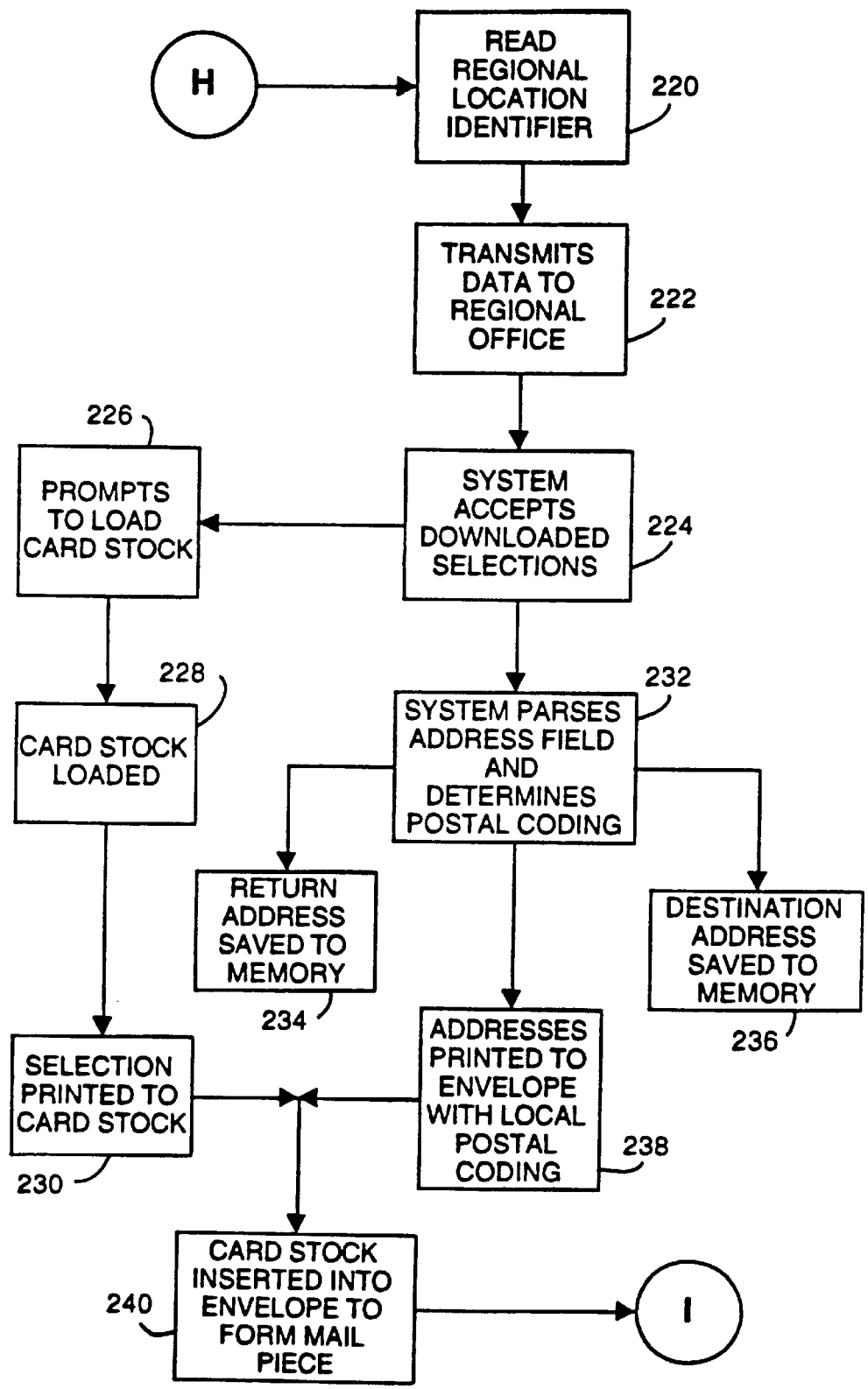
FIGS. 5A and 5B are a flowchart of the system method at a regional or central receiving facility that can track the transaction for accounting purposes.
Figure 5B:
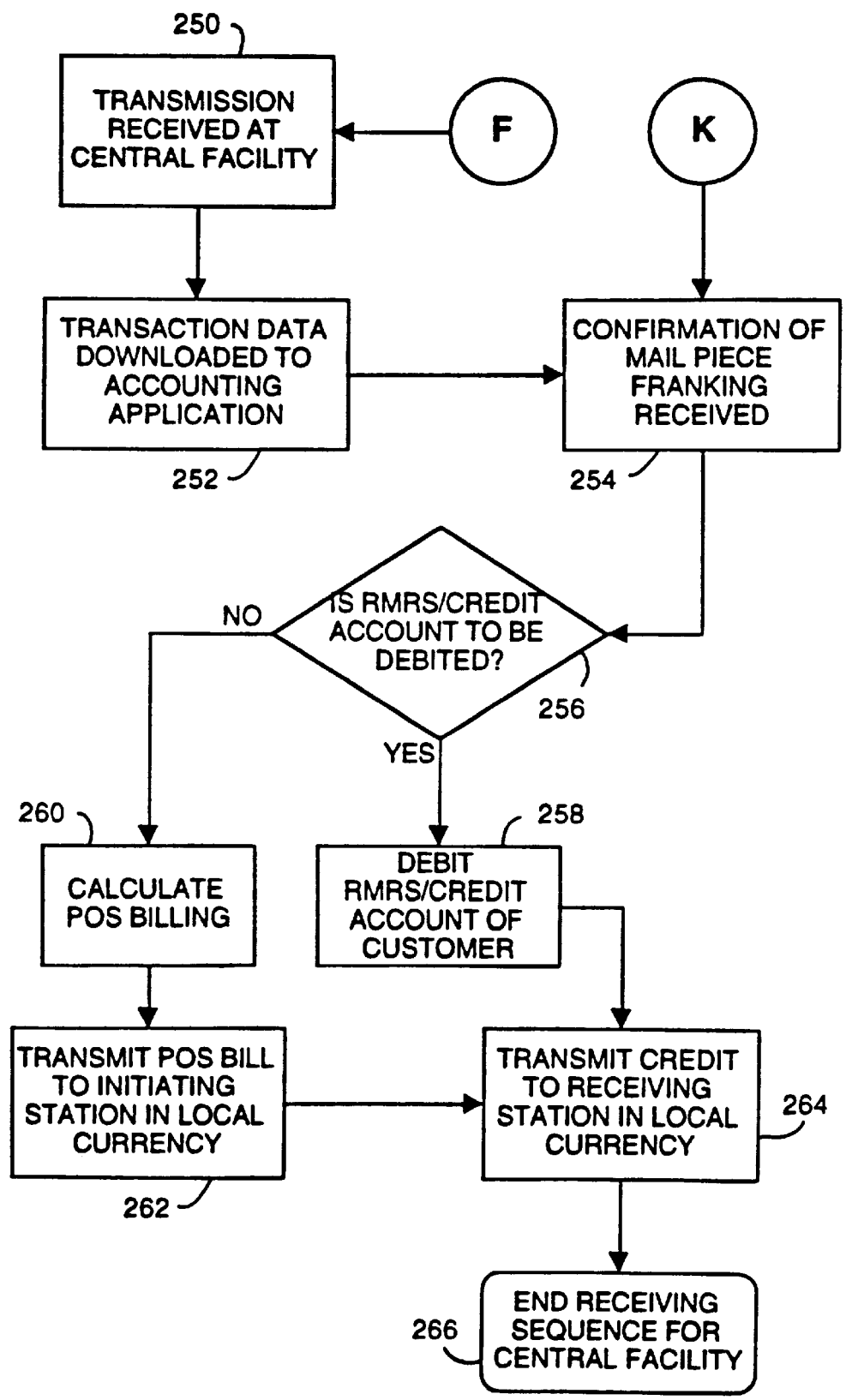

Turning to FIG. 5A, path H can be seen re-entering the method flow at step 220 where the system reads the regional (or national or other local data center) data center location identifier in the data header before advancing to step 222. At step 222, the system re-transmits the mail piece data to the selected data center which accepts the downloaded mail piece data at step 224.

From step 224 the system follows two paths. In following the first path, the method advances to step 226 where the system operator is prompted to load the correct card stock or other printable media. In an alternative embodiment of the system configuration, the paper stock is maintained in a "jukebox" of a type associated with the library use of CD-ROMs and which is well known to those skilled in the art. The downloading of the mail piece data causes the jukebox to select the proper feed path for the requested printable stock. The system operator, or jukebox, loads the correct card stock or printable media at step 228 and the mail piece selection is printed to the loaded printable stock at step 230. The method advances from step 230 to step 240 where the printed card or media is inserted into an envelope which has the destination address, return address, and any bar coding data printed thereupon. From step 240, the method moves along path I to step 194 in FIG. 4C.

The second path leading from step 224 advances to step 232 where the system parses the address field of the mail piece data and determines appropriate postal coding. The method next calls for the addresses to be printed to the envelope at step 238 while essentially simultaneously saving, at step 234, the address data to a memory of a type capable of maintaining a database; and, saving to a memory at step 234 the return address data. Step 238 advances to step 240 where the printed card or media is inserted into the envelope which has the destination address, return address, and any bar coding data printed thereupon. From step 240, the method moves along path I to step 194 in FIG. 4C.

Paths F and K each re-enter the system at FIG. 5B. Turning to FIG. 5B, path F is shown re-entering the system at step 250. Path F was initiated at step 160 when the mail piece data was transmitted from the initiating location. At step 250, the transmission is received at a central location for accounting purposes; the central location can be a data center as previously described, or can be an office location. From step 250 the method proceeds to step 252 where the transaction data (RMRS, debit/credit account, billing address, etc.) is downloaded to an accounting application in a data processing system. The method then advances to step 254 where path K re-enters the system.

At step 254, confirmation of the mail piece franking is received from the destination node. The system advances to step 256 and queries itself as to whether an RMRS or credit card account is to be debited. If the response is "NO," then the system calculates the POS billing at step 260 and transmits the POS bill to the initiating location in local currency at step 262. If, however, the response to the query at step 256 is "YES," then the system, at step 258, issues a debit to the RMRS or credit card account of the customer. From step 258, and from step 262, the method advances to step 264 where the central accounting facility transmits a credit to the destination node in local currency based upon the franking charges and the parameters of the completed mail piece. From step 264, the method advances to step 266 and concludes the receiving sequence for the central facility for this particular transaction.

As can be appreciated by those skilled in the art, a number of variations of the subject invention are possible. These variations include, but are not limited to, the system peripherals at the initiating location and at each of the nodes thereafter, as well as the nature of the materials to be catalogued for downloading. While a preferred embodiment utilizes an on-line catalogue of greeting cards, a selection of text, a selection of language, and the ability to select a service type, it is envisioned that any printable stock could be employed to receive the printed message and that the text can be supplemented with graphics.

What is claimed is:

1. A method for selecting, producing, and delivering a finished mail piece, comprising the steps of:

(a) selecting, at an initiating node, a set of parameters where said parameters together define a mail piece;

(b) selecting a destination address;

(c) transmitting said selected parameters and said destination address to a data center;

(d) reading, at said data center, said destination address and determining a destination node by comparing said destination address to a set of locations of one or more possible production centers, and wherein said selected destination node is the nearest in location to said destination address;

(e) determining whether or not said destination node has resources for fulfilling said selected parameters;

(i) if said destination node can fulfill said selected parameters, then downloading said selected parameters; then printing a predefined subset of said downloaded parameters upon a medium to produce said finished mail piece; and, (ii) if said destination node can not fulfill said selected parameters, then transmitting said selected parameters and said destination address to a nearest location capable of fulfilling said selected parameters, then printing a predefined subset of said. downloaded parameters upon a medium to produce said finished mail piece; and (f) receiving at said data center a confirmation that said production center has received said transmitted set of parameters and prepared said mail piece for delivery; and (g) delivering said finished mail piece.

2. The method of claim 1, wherein said mail piece is a greeting card or a brochure.

3. The method of claim 1, wherein said destination node comprises:

(a) means for accepting said downloaded parameters into a memory;

(b) means for preparing said media to be printed;

(c) means for printing said predefined subset of said downloaded parameters to said media to form a printed media piece;

(d) means for inserting said printed media piece into said envelope to form a mail piece and printing said destination address upon said envelope;

(e) means for franking said envelope in proper local currency; and (f) means for delivering said envelope to a local postal stream.

4. The method of claim 1, wherein said data center determines what additional services are available at said destination node for production and delivery of said finished mail piece; and, where said data center transmits to said initiating node in the form of a menu said additional services for selection by said initiating party.

5. The method of claim 1, wherein said data center is co-located with said initiating node.

6. The method of claim 1, further comprising the steps of:
   (a) inserting said printed media into an envelope to complete production of said finished mail piece;
   (b) printing said destination address upon said envelope;
   (c) franking said envelope in a first currency type corresponding to the location of said destination node;
   (d) delivering said envelope to a local postal stream for delivery by said local postal stream to said destination address; and
   (e) charging an initiating party for services rendered in a second currency type corresponding to the location of said initiating node.

7. The method of claim 6, further comprising the steps of:
   (a) recording said franking of said envelope in said proper local currency;
   (b) calculating the exchange of said proper local currency for said initiating local currency;
   (c) determining charges for said transaction;
   (d) charging the cost of said transaction to a charge account of an initiating party in the local currency of said initiating party; and
   (e) preparing a billing statement in respect of said transaction.

8. The method of claim 1, wherein said set of parameters comprises:
   (a) a choice of media stock;
   (b) a choice of text to be printed upon said media stock;
   (c) a choice of language for said text;
   (d) a choice of delivery service type;
   (e) a destination address;
   (f) a return address; and
   (g) an account number for debiting the cost of a transaction.

9. The method of claim 8, wherein said transaction comprises:
   (a) production, franking, and delivery of said mail piece; and
   (b) confirmation from said destination node that delivery to said local postal stream has been completed.

10. The method of claim 1, wherein said data center is a destination node.

11. The method of claim 1, or of claim 10, wherein said destination node receives said downloaded parameters; and, wherein said downloaded parameters include a destination address; and said destination node compares said destination address with a set of addresses and addressees contained on an address list retained in a memory of said data processing system; and if an address on said address list corresponds to said destination address, then displaying said corresponding address to said initiating party so that said initiating party can determine whether or not said destination address or said corresponding address should be updated in any way.

12. The method of claim 1, wherein said data processing system comprises means for accessing said data center.

13. The method of claim 12, wherein said access means is a computer comprising a monitor, data entry means, said program, and means for data transmission.

14. The method of claim 12, said access means is a storefront data entry system comprising a monitor, data entry means, said program, and means for data transmission.

15. The method of claim 12, wherein said access means is a kiosk comprising a monitor, data entry means, said program, and means for data transmission.

16. The method of claim 15, wherein said kiosk includes means for accepting a credit card or a charge card for payment in respect of said transaction.

* * * * *